(12) United States Patent
Beker

(10) Patent No.: US 8,065,671 B1
(45) Date of Patent: Nov. 22, 2011

(54) SYSTEMS AND METHODS FOR PRODUCT UPDATES WITH PROVISIONING OF DATA ITEMS

(75) Inventor: Gabriel Alejandro Beker, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 1128 days.

(21) Appl. No.: 11/833,516

(22) Filed: Aug. 20, 2007

(51) Int. Cl.
*G06G 9/44* (2006.01)
*G06F 9/45* (2006.01)

(52) U.S. Cl. .................. 717/168; 717/169; 717/173

(58) Field of Classification Search .......... 717/168–175; 709/203–204
See application file for complete search history.

(56) References Cited

U.S. PATENT DOCUMENTS

| | | | | |
|---|---|---|---|---|
| 6,167,567 A * | 12/2000 | Chiles et al. | | 717/173 |
| 6,389,556 B1 * | 5/2002 | Qureshi | | 714/15 |
| 6,389,589 B1 * | 5/2002 | Mishra et al. | | 717/170 |
| 6,773,647 B2 * | 8/2004 | McGuire et al. | | 264/167 |
| 6,904,592 B1 * | 6/2005 | Johnson | | 717/168 |
| 6,986,133 B2 * | 1/2006 | O'Brien et al. | | 717/173 |
| 7,159,214 B2 * | 1/2007 | Rajaram et al. | | 717/172 |
| 7,281,245 B2 * | 10/2007 | Reynar et al. | | 717/173 |
| 7,343,599 B2 * | 3/2008 | Panjwani | | 717/168 |
| 7,346,705 B2 * | 3/2008 | Hullot et al. | | 709/238 |
| 7,380,243 B2 * | 5/2008 | Sugishita et al. | | 717/168 |
| 7,562,358 B2 * | 7/2009 | Bennett et al. | | 717/170 |
| 7,577,949 B2 * | 8/2009 | Barr et al. | | 717/169 |
| 7,634,772 B2 * | 12/2009 | Parthasarathy et al. | | 717/178 |
| 7,653,687 B2 * | 1/2010 | Reisman | | 709/203 |
| 7,657,866 B2 * | 2/2010 | Cope et al. | | 717/101 |
| 7,665,086 B2 * | 2/2010 | Cope et al. | | 717/174 |
| 7,669,199 B2 * | 2/2010 | Cope et al. | | 717/174 |
| 7,818,740 B2 * | 10/2010 | Bankston et al. | | 717/173 |
| 7,865,479 B2 * | 1/2011 | Gu et al. | | 707/693 |
| 7,873,956 B2 * | 1/2011 | Kim et al. | | 717/168 |
| 7,930,363 B2 * | 4/2011 | Chea et al. | | 709/218 |

OTHER PUBLICATIONS

Chen et al, "Dynamic software updating using a relaxed consistency model", IEEE, pp. 1-17, 2010.*
Sherwood et al, "Patchable instrcuction ROM architecture", ACM CASES, pp. 24-33, 2001.*
Perkins et al, "Automatically patching errors in deployed software", ACM SOSP, pp. 87-102, 2009.*
Samuel et al, "Survivable key compromise in software update systems", ACM CCS, pp. 61-72, 2010.*
Coville, R., Wagner, R., and Nicolett, M.; "Patch Management Benefits, Challenges and Prerequisites", SDecision Framework, DF-18-0680, Gartner Inc. and/or Affiliates, Nov. 4, 2002, pp. 1-4,; Copyright 2002.
Delis, Alexios and Roussopoulos, Nick; "Performance and Scalability of Client-Server Database Architectures", Computer Science Department, University of Maryland, College Park, MD, pp. 1-14, 1992.
Pruett, G. et al; "BladeCenter systems management software", International Business Machines Corporation, IBM J. Res. & Dev. vol. 49, No. 6, pp. 963-975, North Carolina, Copyright 2005.

* cited by examiner

*Primary Examiner* — Anil Khatri

(74) *Attorney, Agent, or Firm* — Brooks, Cameron & Huebsch, PLLC

(57) ABSTRACT

Software deployment systems and techniques allow unattended and virtually real-time provisioning of a data item, such as a set of commands, a patch, update, or upgrade, of a product on one or more client computing devices. An example product may be a large-scale software application, such as a development environment. Update engines are used in conjunction with policy files so that the product's versions and updates on the client computing devices are consistent with each other and with the main development environment as represented by a main policy file.

16 Claims, 5 Drawing Sheets

SYSTEMS AND METHODS FOR PRODUCT UPDATES WITH PROVISIONING OF DATA ITEMS

CROSS-REFERENCE TO RELATED APPLICATIONS

This application is related by subject matter to that disclosed in the following commonly assigned applications, the entirety of which are hereby incorporated by reference herein: U.S. patent application Ser. No. 11/833,625 and U.S. patent application Ser. No. 11/833,656, each filed on Aug. 8, 2007 and each entitled "Systems And Methods For Product Updates Provisioning."

BACKGROUND

Large-scale software applications, such as development environments, that are packaged and distributed to client computing devices, are becoming larger and more complex. An example development environment may be 4-8 Gigabytes or larger. Such a large development environment is too large to transmit over a network to client computing devices (e.g., programmers' or developers' desktop computers) using a conventional packaging tool.

Network installation may be used, but this is problematic because clients, such as the individual programmers or developers, may subsequently download and install patches, updates, and future versions without system administrator authorization. Because of this, the client computing devices do not remain consistent, as some are updated, some are not, etc. This leads to a non-heterogenous client computing device environment.

Additionally, some programmers would then be producing code that may account for updates that they had personally installed on their computing device, but the update may not yet have been installed systemwide. In this manner, the update level of the production code, which gets shipped out, is not in sync with the update level of the development environment.

Product license compliance is also challenging because manual loads by frustrated users in need of productivity tools make monitoring difficult.

SUMMARY

Software deployment systems and techniques allow unattended and virtually real-time provisioning of a data item, such as a set of commands, a patch, update, or upgrade of a product on one or more client computing devices. An example product may be a large-scale software application, such as a development environment. Update engines are used in conjunction with policy files so that the product's versions and updates on the client computing devices are consistent with each other and with the main development environment as represented by a main policy file. Any system provisioning tool with unattended command line triggering capabilities may be used.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Although the examples described herein mention updates and patches, it is contemplated that other items, such as hot fixes, upgrades, and configuration changes, may be provisioned, delivered, and installed in accordance with the aspects described herein.

Figure 1:
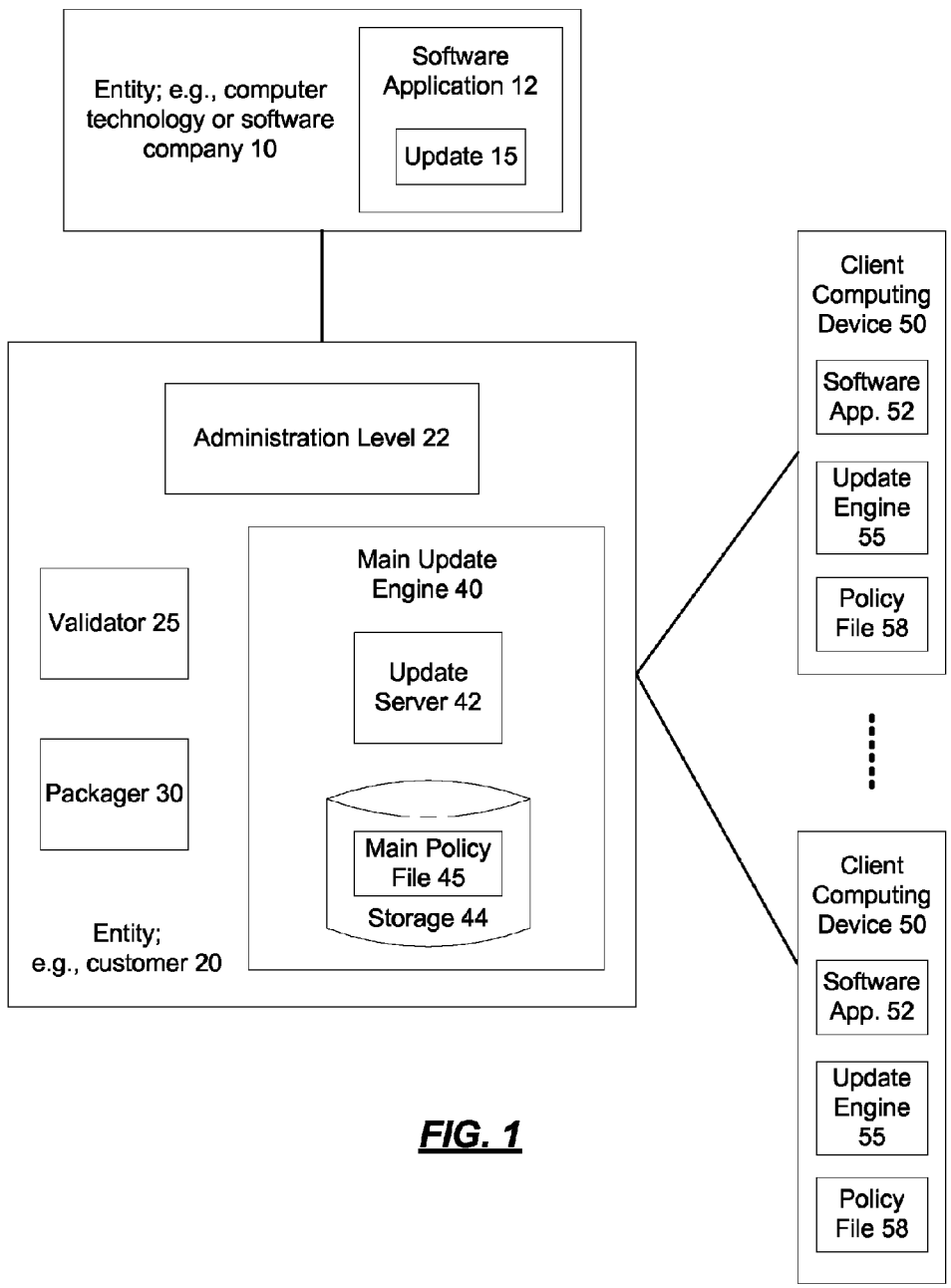
FIG. 1 is a block diagram of an example product update provisioning system.

FIG. 1 is a block diagram of an example product update provisioning system. An entity 10, such as a computer technology or software company, distributes software updates 15 to a large scale software application 12. Another entity 20, such as a customer may receive the updates 15, for example at an administration level 22, such as an information technology (IT) department or system administration department. Ultimately, client computing devices 50, such as computing devices used by programmers or developers associated with the customer entity 20, will receive the updates 15, e.g., via any system provisioning tool with unattended command line triggering capabilities. Although only two client computing devices 50 are shown in FIG. 1, it is contemplated that any number of client computing devices may be in communication with, or otherwise associated with, the customer entity 20. An example client computing device is described with respect to FIG. 5.

In an implementation, a validator 25 may be provided, along with a packager 30, that can be accessed by the administration level 22, for example. The validator 25 and packager 30, respectively, may be used to validate the updates and package them for storage and/or distribution to the client computing devices 50.

In an implementation, a main update engine 40, comprising an update server 42, may store the packaged updates or otherwise provides client computing devices 50 with access to the packaged updates as shared resources. The main update engine 40 may be embedded in a software development environment at the customer entity 20 and may check the version of the software application on the client computing device 50, and may provide (e.g., via download) the latest update, version, patches, etc. to the client computing device 50. The main update engine 40 may be accessed by graphical user interface (GUI) or by command line batch, for example. An update engine 55 may be provided at each of the client computing devices as well. These local update engines 55 may be used in updating the respective software applications 52 at the client computing devices 50, as described further herein.

Figure 2:
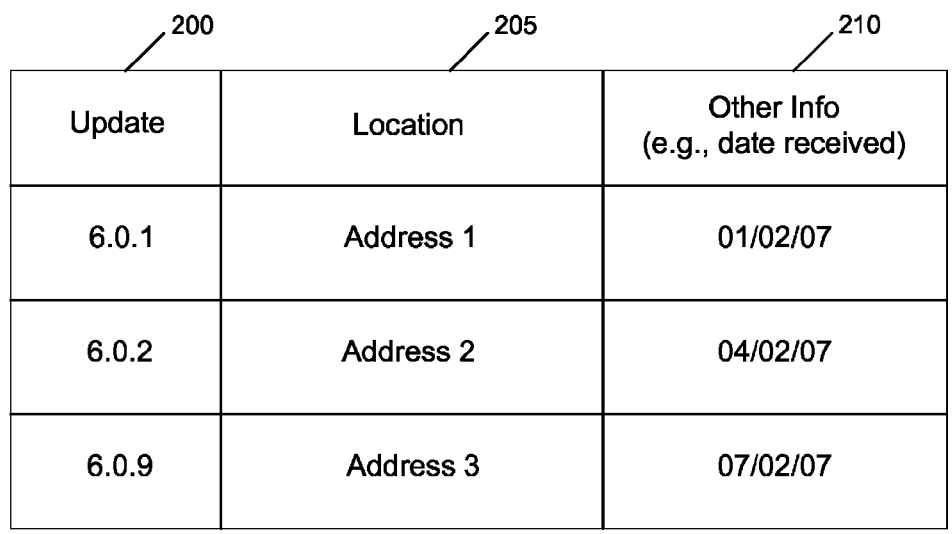
FIG. 2 is a diagram of an example policy file.

In an implementation, a file 45, such as a main policy file, which may be an xml file (e.g., policy.xml), may store the available updates and their locations in storage 44, such as a database, associated with the main update engine 40. The main policy file 45 may be used to check for differences and updates, and may make the changes or updates. An example policy file is shown in FIG. 2. In this example policy file, each received update 200 is listed, along with a corresponding storage location 205 and other information 210, such as the date the update was received at the customer entity 20. A policy file 58 may be stored at each of the client computing devices 50 as well, and may contain information similar to that in the main policy file, such as latest update and date installed.

Figure 5:
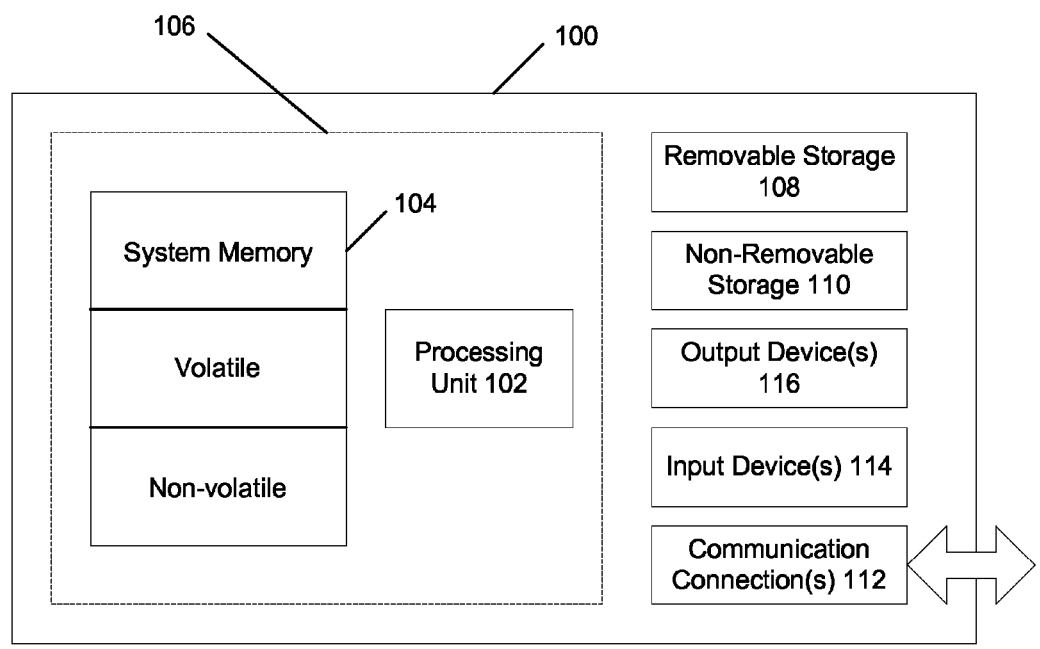
FIG. 5 is a block diagram of an example computing environment in which example embodiments and aspects may be implemented.

The example validator 25, packager 30, and main update engine 40 may be implemented in a computing device or environment, such as that described with respect to FIG. 5, for example. Software modules may be used in the performance of the example techniques described herein. Example software modules may include modules for performing the validating and packaging.

Figure 3:
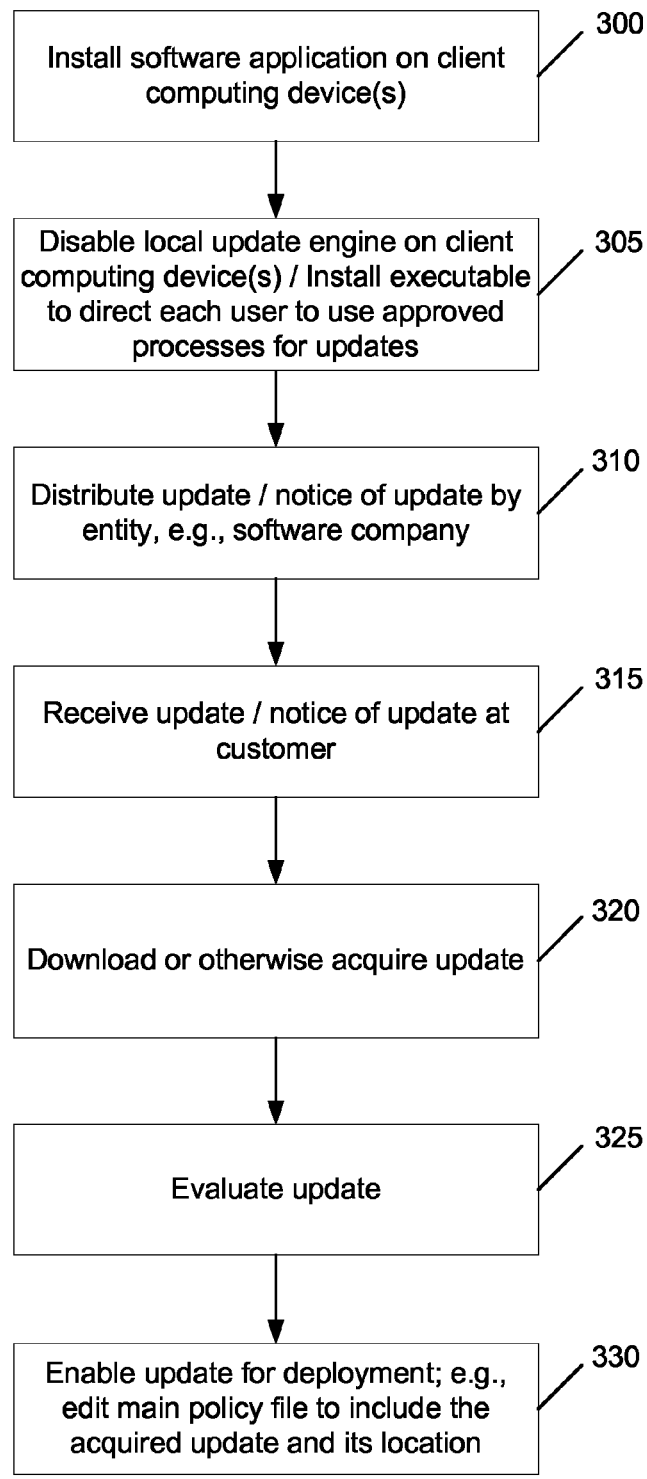
FIG. 3 is a flow diagram of an example method of storing a product update.

FIG. 3 is a flow diagram of an example method of storing a product update. In an implementation, at operation 300, the original software application (e.g., the base package) is installed, e.g., by any system provisioning tool with unattended command line triggering capabilities, on the client computing device(s). The local update engine on each client computing device that had the base package installed may then be disabled, at operation 305. Thus, the user's individual updating ability is disabled. In this manner, the user of a client computing device may not install an update without the customer entity (e.g., the administration level 22) providing and directing the update installation.

The disabling of the local update engine on each client computing device may be performed by the same script that installs the base package, for example. In an implementation, a dummy executable is installed on each client computing device that directs each user of each client computing device to use the approved software distribution processes for installing updates (e.g., to have the system administrator initiate and direct the update installation).

At operation 310, the computer technology or software company, for example, may distribute an update (e.g., a patch) or a notice of an available update for the base package. The update or notice may be received by the customer entity, for example, at operation 315. The customer, or an associated party such as a system administrator, may download or otherwise acquire the update at operation 320, and may evaluate it at operation 325.

The update may then be enabled for deployment at operation 330. In an implementation, the main policy file associated with the customer (e.g., a policy.xml file) is edited to include the acquired update and its location, as well as any other additional information pertaining to the update.

Figure 4:
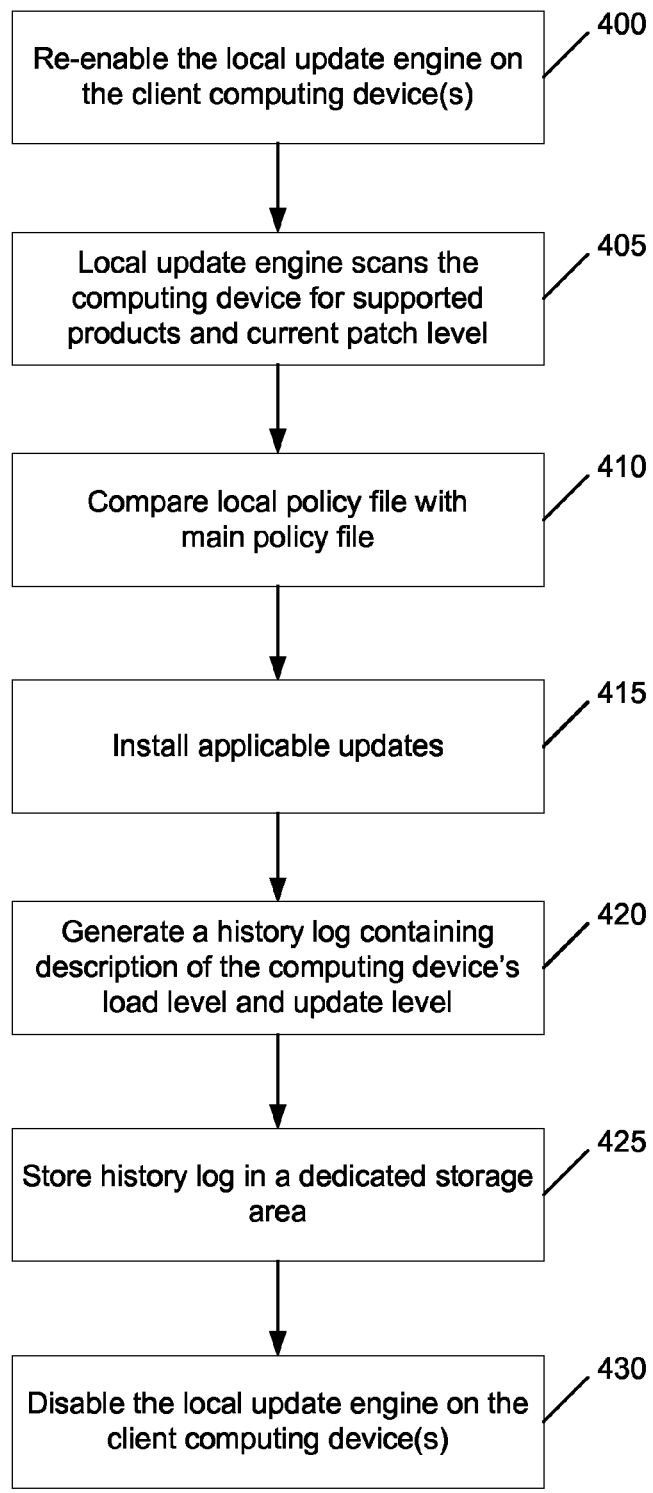
FIG. 4 is a flow diagram of an example method of installing a product update.

At some point, the update may be desired to be installed on a client computing device. FIG. 4 is a flow diagram of an example method of installing a product update. A product update package may re-enable the local update engine on the client computing device at operation 400. This may be performed through the command line, for example, which points the local update engine to the main policy file to check for available updates.

The local policy file stored on each of the client computing devices may be queried locally at operation 405, for example by the local update engine scanning the associated client computing device for supported products (products that are compatible with the client computing device), and associated data items such as updates and patch levels, for example. The local policy file may be compared to the main policy file maintained by the customer at operation 410. In an implementation, the versions and updates of the software application stored on each client computing device are compared to those that have been acquired, validated, and packaged for deployment by the customer.

At operation 415, the applicable updates may be installed, for example by the customer providing each client computing device with the versions and updates needed to make the client computing devices consistent with each other and with the main development environment as represented by the main policy file. Thus, for example, the update engine at the customer may compare the main policy.xml with each client computing device's policy.xml, and may install the differences to make all the computers consistent. Updating and patching may be performed by command line (batch file).

After the updating is complete, a history command may be invoked by the customer update engine, for example, at operation 420 to generate a history log or other file containing a description of each client computing device's load and update level, for example. The history log may be maintained or otherwise stored, e.g., in a dedicated folder, in storage associated with the customer update engine, at operation 425. At operation 430, the local update engine on the client computing device may be disabled, to again lock the update environment.

Thus, a fully updated or patched load may be rolled out or otherwise provided in unattended fashion to as many client computing devices as desired, in a repeatable, consistent fashion. In this manner, for example, a system administrator can match server (at the customer site) and desktop (at the client computing device) update level. Should a discrepancy occur, the history log may be consulted to determine how the discrepancy was introduced and to take measures to correct the discrepancy and prevent it from recurring.

Additionally, for example, the history log may be used for licensing and product tracking. For example, the latest history log may be checked to determine which client computing devices are using which software applications, updates, versions, etc., so that proper licenses may be obtained and maintained.

Exemplary Computing Arrangement

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 5 by dashed line 106.

Device 100 may have additional features/functionality. For example, device 100 may include additional storage (removable and/or non-removable) including, but not limited to, magnetic or optical disks or tape. Such additional storage is illustrated in FIG. 5 by removable storage 108 and non-removable storage 110.

Device 100 typically includes a variety of computer readable media. Computer readable media can be any available media that can be accessed by device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable storage medium having computer-readable instructions to provision a data item, said computer-readable instructions comprising instructions for:
   disabling an update engine associated with a computing device such that a user of the computing device is prevented from independently updating the computing device;
   receiving the data item at an entity separate from the computing device; and
   enabling the data item for deployment to the computing device and installing a software application on the computing device prior to disabling the update engine, the update engine being disabled responsive to the installing of the software application.

2. The computer-readable storage medium of claim 1, wherein the data item comprises at least one of an update, a patch, or an upgrade to the software application.

3. The computer-readable storage medium of claim 1, wherein the software application comprises a development environment.

4. The computer-readable storage medium of claim 1, further comprising instructions for evaluating the data item prior to enabling the data item for deployment.

5. The computer-readable storage medium of claim 1, further comprising instructions for receiving a notice of the availability of the data item prior to receiving the data item at the entity.

6. The computer-readable storage medium of claim 1, wherein enabling the data item for deployment to the computing device comprises editing a policy file at the entity to include information pertaining to the received data item.

7. A non-transitory computer-readable storage medium having computer-readable instructions to provision a data item, said computer-readable instructions comprising instructions for:
   enabling a previously disabled update engine associated with a computing device such that the computing device is configured to allow the data item to be installed thereon;
   determining whether the data item has already been installed on the computing device;
   if the data item has not already been installed on the computing device, then installing the data item on the computing device; and
   generating a history log based on the installation of the data item and associated information related to the computing device and determining whether the data item has already been installed on the computing device comprises the update engine scanning the computing device for supported products and associated data items.

8. The computer-readable storage medium of claim 7, wherein determining whether the data item has already been installed on the computing device comprises comparing a policy file associated with the computing device with a policy file associated with an entity that has already received the data item, the entity being separate from the computing device.

9. The computer-readable storage medium of claim 7, wherein installing the data item on the computing device is performed by a system provisioning tool with command line triggering capability.

10. The computer-readable storage medium of claim 7, wherein the data item comprises at least one of an update, a patch, or an upgrade to a development environment software application.

11. The computer-readable storage medium of claim 7, further comprising instructions for storing the history log in a storage device associated with an entity separate from the computing device, the entity having initially received the data item prior to enabling the update engine associated with the computing device.

12. A non-transitory computer-readable storage medium having computer-readable instructions to provision a data item, said computer-readable instructions comprising instructions for:
   installing a software application on a plurality of computing devices associated with a first entity;
   preventing each of the computing devices from installing the data item associated with the software application without a direction from the first entity;
   receiving the data item associated with the software application at the first entity from a second entity;
   installing the data item on each of the computing devices as needed to make the software application on each of the computing devices consistent with each other;
   generating a history log comprising information pertaining to the data item installed on each computing device; and
   storing the history log in a storage device associated with the first entity and preventing each of the computing devices from installing the data item comprises disabling a update engine on each of the computing devices, and wherein installing the data item on each of the computing devices comprises re-enabling the update engine on each of the computing devices as needed.

13. The computer-readable storage medium of claim 12, wherein the data item comprises at least one of an update, a patch, or an upgrade to the software application.

14. The computer-readable storage medium of claim 12, wherein the first entity and each of the computing devices has a respective policy file, and further comprising instructions for comparing the policy file at the first entity with each of the policy files at the computing devices prior to installing the data item.

15. The computer-readable storage medium of claim 12, further comprising instructions for validating and packaging the data item at the first entity prior to installing the data item.

16. The computer-readable storage medium of claim 12, further comprising instructions for maintaining a license for the software application using the history log.

\* \* \* \* \*